(12) United States Patent
Agrawal (10) Patent No.: US 11,819,892 B2
(45) Date of Patent: Nov. 21, 2023

(54) RECYCLING OF SMART WINDOWS

(71) Applicant: Polyceed Inc., Tucson, AZ (US)

(72) Inventor: Anoop Agrawal, Tucson, AZ (US)

(73) Assignee: Polyceed Inc., Tucson, AZ (US)

( * ) Notice: Subject to any disclaimer, the term of this patent is extended or adjusted under 35 U.S.C. 154(b) by 1033 days.

(21) Appl. No.: 16/510,229

(22) Filed: Jul. 12, 2019

(65) Prior Publication Data

US 2020/0016641 A1 Jan. 16, 2020

Related U.S. Application Data

(60) Provisional application No. 62/698,119, filed on Jul. 14, 2018.

(51) Int. Cl.
| | |
|---|---|
| B09B 3/40 | (2022.01) |
| C01D 15/00 | (2006.01) |
| C03C 1/00 | (2006.01) |
| C03C 1/02 | (2006.01) |
| C08J 11/06 | (2006.01) |
| C22B 7/00 | (2006.01) |
| B09B 3/80 | (2022.01) |

(52) U.S. Cl.
CPC ............... B09B 3/40 (2022.01); B09B 3/80 (2022.01); C01D 15/00 (2013.01); C03C 1/002 (2013.01); C03C 1/024 (2013.01); C08J 11/06 (2013.01); C22B 7/007 (2013.01)

(58) Field of Classification Search
CPC .. B09B 3/40; B09B 3/80; C01D 15/00; C03C 1/002; C03C 1/024; C08J 11/06; C22B 7/007

USPC .......................................................... 521/40
See application file for complete search history.

(56) References Cited

U.S. PATENT DOCUMENTS

| | | | |
|---|---|---|---|
| 3,912,534 A * | 10/1975 | Gurta | C03C 1/024 209/11 |
| 4,145,202 A * | 3/1979 | Grodin | C03B 37/10 134/2 |
| 5,394,264 A | 2/1995 | Marchese et al. | |
| 5,724,187 A | 3/1998 | Varaprasad et al. | |
| 5,758,832 A | 6/1998 | Grainger | |
| 5,891,011 A | 4/1999 | Wicks | |
| 6,063,995 A | 5/2000 | Bohland et al. | |
| 6,129,779 A | 10/2000 | Bohland et al. | |
| 6,348,159 B1 | 2/2002 | Dapkus et al. | |
| 6,391,165 B1 | 5/2002 | Bohland et al. | |
| 6,502,424 B1 | 1/2003 | Debailleul | |
| 7,192,564 B2 | 3/2007 | Cardarelli et al. | |
| 8,591,718 B2 | 11/2013 | Lane et al. | |

(Continued)

FOREIGN PATENT DOCUMENTS

| | | | | |
|---|---|---|---|---|
| CH | 680837 A * | 11/1992 | ............ | B03B 9/062 |
| DE | 3774490 | * 12/1991 | | |

(Continued)

*Primary Examiner* — Melissa S Swain
(74) *Attorney, Agent, or Firm* — Rothwell, Figg, Ernst & Manbeck, P.C.

(57) ABSTRACT

The present invention relates to the methods of recycling electrochromic devices and also designing such devices while keeping recyclability in perspective. Recyclability includes recovering of certain materials for re-use within the same application or other applications. Using recycling reduces or eliminates waste stream quantities to be disposed of and/or reduces toxicity of these waste streams.

19 Claims, 6 Drawing Sheets

(56) References Cited

U.S. PATENT DOCUMENTS

| | | |
|---|---|---|
| 9,260,582 B2 | 2/2016 | Uang |
| 9,312,581 B2 | 4/2016 | Laucournet et al. |
| 9,499,103 B2 | 11/2016 | Han |
| 9,700,987 B1 | 7/2017 | Jaunzemis |
| 10,115,051 B2 | 10/2018 | Takashima et al. |
| 2005/0028556 A1* | 2/2005 | Akai ................. C03C 1/024 |
| | | 65/134.8 |
| 2009/0209667 A1* | 8/2009 | Thompson ............ C08J 11/08 |
| | | 526/315 |
| 2010/0249253 A1 | 9/2010 | Fernandez Acevedo et al. |

FOREIGN PATENT DOCUMENTS

| | | | | |
|---|---|---|---|---|
| DE | 4418573 C1 * | 2/1996 | ............. | B03B 9/062 |
| WO | WO-9302815 A1 * | 2/1993 | ............. | B03B 9/062 |

* cited by examiner

Fig 6: Schematics of EC devices with various kinds of materials

RECYCLING OF SMART WINDOWS

CROSS-REFERENCE TO RELATED APPLICATIONS

The present application claims priority benefit of U.S. provisional application Ser. No. 62/698,119, filed Jul. 14, 2018, which is incorporated herein by reference in its entirety.

FIELD OF THE INVENTION

The present invention relates to methods for recycling of smart windows and products used in buildings and transportation.

BACKGROUND OF INVENTION

Smart windows are complex, multi-component electrochemical structures that change color, opacity, and/or transparency with the application of a voltage. Used in buildings and for transportation, these smart windows provide shade, energy savings, privacy, partitions and so forth. The user may control the heat and/or light that passes through the glass using electronic switching, rather than using mechanical shades. The element of these smart windows which results in this optical change is usually based on an electrochromic (EC) device or a liquid crystalline (LC) device. Several examples in this disclosure refer to EC devices, but the recyclability principles also apply to the LC devices. These principles may also be used to recycle EC automotive mirrors.

Used in buildings and in transportation windows, these products result in energy efficient building envelopes and increased comfort by regulating the solar energy penetration through the windows. As these window systems become ubiquitous it is important that these are recycled at the end of their life so that the impact on the resources and environment is minimized. In addition, such systems should be designed using materials and technologies so that it is easier for them to be recycled (recycling includes any of the following, re-use of certain materials, conversion of materials for other uses, recovering some of the higher value materials, reducing the waste to be disposed of) using minimum resources and causing minimum harm to the environment when the effluents are discharged. The latter refers to reducing toxicity of the waste streams prior to their discharge.

Figure 1:
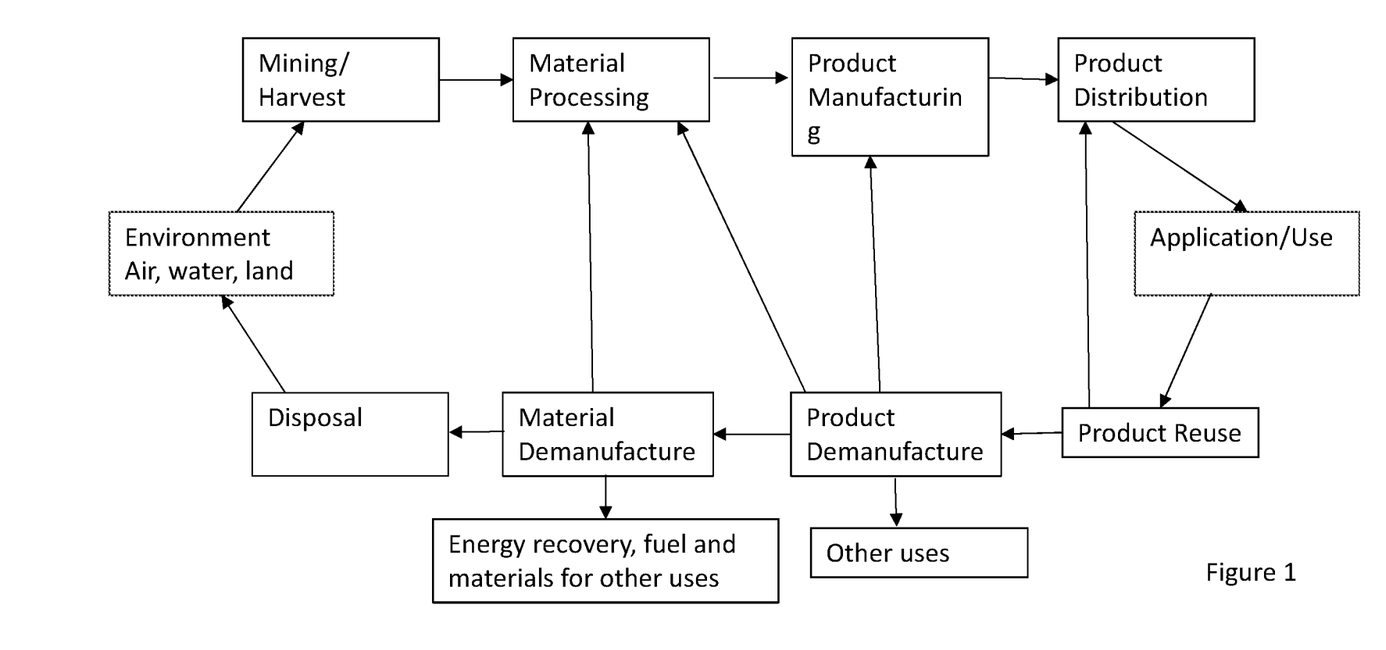
FIG. 1 illustrates a schematic representation of a product lifecycle including its manufacturing, demanufacturing, recycling and disposal.

FIG. 1 shows a general concept of a product manufacturing and its recyclability including demanufacturing steps. The raw materials are initially obtained from the environment which are mined and then processed into intermediate materials or parts which are then used to manufacture the product which is then distributed and used. After its use-life is completed it is taken back by the same party which had originally distributed the product or another party. This party may find another use for the product or it is submitted for demanufacturing. Demanufacturing means that the product is disassembled and/or is broken down. Some or all of these parts may be used again for the manufacturing of the new products, or some materials are reclaimed or demanufactured which are then cycled back into a similar new product or alternative uses are found. Further some of the components may be converted to materials or fuels, and in the conversion process energy is produced (e.g., by incineration of some components) which is recovered or used and a smaller fraction of waste may be produced safe for disposal into the environment. The objective here is to teach processes and methods for demanufacturing of smart window products and taking them through the end-of life cycle as explained above. In addition, teachings are also incorporated on how to design the smart windows in the first place so that they are easier and safer to demanufacture, recycle and dispose of.

It is important to keep in mind that during demanufacturing, it is not necessary that all materials must be restored to their pristine form and reused in the same application or to make the same product. In most instances it is sufficient that these be separated into waste streams which could be gainfully employed (or used) by other industries without creating huge waste dumps or disposable wastes which are toxic. The other industries may recover materials from these more efficiently or they may be able to use these in manufacturing of other products.

The reuse and recycling concepts are increasingly becoming popular and are being required for a variety of products as they enter into the end of life phase, because their simple disposal is not being permitted in many regions of the world. Some of these in the energy area include batteries, solar cells, wind mills, etc. The objective of this patent is to teach recycling and disposal of smart windows used in buildings and transportation.

SUMMARY OF THE INVENTION

The present disclosure includes a method of recycling an electrochromic glass window comprising glass and organic components, the method comprising: breaking the electrochromic glass window into pieces having an average size of less than 100 $cm^2$; and heating the said pieces to a temperature lower than the glass transition temperature of the said glass to incinerate the organic components without melting the glass. In some aspects, depending on the glass transition temperature of the glass, the heating may be, for example, to a temperature between 250° C. to 500° C., 275° C. to 450° C., 300° C. to 400° C., or any temperature or combination of temperatures in any of the recited ranges.

The present disclosure also includes a method of recycling an electrochromic glass window comprising glass and one or more metals and metal compounds, the method comprising: breaking the electrochromic glass window into pieces having an average size of less than 100 $cm^2$; and treating the said pieces in an acidic solution having a pH of less than 3 to dissolve at least one of lithium, rhodium, ruthenium, silver, indium, tungsten, nickel, and tin from the pieces into the acid solution.

The present disclosure also includes a method of recycling an electrochromic glass window comprising glass, one or more organic components, and one or more metal compounds, the method comprising breaking the electrochromic glass window into pieces having an average size of less than 100 $cm^2$; and treating the said pieces in a liquid composition comprising an organic solvent to extract at least one of the organic components and metal compounds.

The present disclosure also includes recycled products formed by the methods of the present disclosure. The present disclosure also includes newly manufactured glass and electrochemical devices made using the recycled products formed by the method of the present disclosure.

Other features and characteristics of the subject matter of this disclosure, as well as the methods of operation, functions of related elements of structure and the combination of parts, and economies of manufacture, will become more

DETAILED DESCRIPTION

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

The singular forms "a," "an," and "the" include plural referents unless the context clearly dictates otherwise.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value.

Generally herein, the term "or" includes "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, certain compositions, injuries or conditions, steps, or the like may be discussed in the context of one specific embodiment or aspect. It is understood that this is merely for convenience, and such disclosure is equally applicable to other embodiments and aspects found herein.

Figure 2:
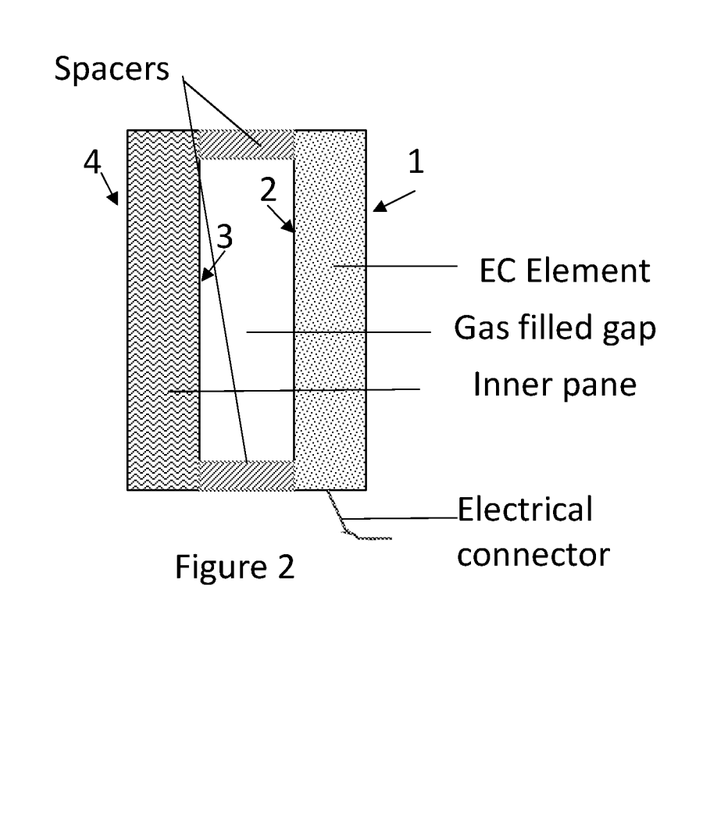
FIG. 2 illustrates schematics of a few different configurations of a dual pane Integrated Glass Unit (IGU) comprising a smart window.

FIG. 2 shows schematics of an integrated glass unit (IGU), i.e., a smart window construction for use in a building which contains an electrochromic (EC) element. This unit comprises of a dual pane structure where the outer pane is an EC element which uses glass substrates and the inner pane is a glass sheet. These are separated by a gap which is typically filled with a gas. It may be filled with dry air or nitrogen, but usually it is preferred that a low conductivity gas be used such as argon, krypton, sulfur hexafluoride, and mixture of these gases, which may be further mixed with dry air and/or nitrogen. The glass panes are separated at the perimeter by spacers which are bonded to these two panes, generally using a butyl adhesive as that is flexible and has low gas permeability. The spacers may be metallic or these could be polymeric or composites such as glass reinforced polymers. The surfaces of the panes facing the outside of the building, gap and the building inside are numbered 1 through 4 starting from the outside surface. Further, one of the surfaces 2, 3 or 4 is coated with a low emissivity (low-e) coating. This coating is not shown in this figure. An electrical connector is also shown that connects the EC unit to a power supply or any other wired controllers and sensors which may be used. The electrical connectors may comprise additional leads connected to sensors for measuring temperature and other properties used for fine tuning the powering protocol to get the desired optical characteristics. Depending on the application and the removal of the window from the site for disposal, the smart window may refer to only the EC and/or the LC panel, may be a complete IGU unit comprising the EC and/or the LC panel, or even a complete IGU unit mounted in a window frame. The frames may be made out of metal, wood and plastics such as poly vinyl chloride, polyester (includes glass reinforced polyester), etc. IGU's also include metal or flexible plastic spacers made out of extruded profiles using polyurethanes, butyls and may also contain metallic reinforcing cores, sealants such as butyls (including polyisoprene), polysulfides, polyurethanes and silicones are also used in addition to the spacers. For example, IGUs are routinely used in the buildings and the EC panel may be further laminated. The window construction may include other variations, such as triple glass constructions, constructions with vacuum insulated glass, etc. EC panels used for interior partitions in buildings and may not be in an IGU configuration. EC panels with or without lamination to other glass or plastic panels may be used in transportation industry, like glazing for automotive, planes, trains, boats, etc.

The above example of the IGU uses friable substrates, generally glass both in the inner pane and in the construction of the EC element. Friable substrates are those which can be broken into pieces or crushed into a powder upon impact and include various types of glass including, but not limited to chemically- or heat-strengthened glass, e.g., tempered glass. One method of recycling involves recovering friable material, recovering metallic materials, particularly those which may be toxic or of higher value, and recovering energy by pyrolysis of organic and polymeric materials.

The process of recycling/materials recovery starts by removing the IGU unit from the window frame and cutting its electrical connection with the electronics. The electronics may be left in place and reused or it may be also removed and recycled using standard methods used in the electronics industry. In one embodiment the two panels comprising the IGU are separated from the perimeter spacers (which are channel type construction running along the perimeter) by cutting through the adhesive (typically butyl adhesive). This may be accomplished more easily by using a heated knife (blade). The channels if metallic may be reused (or the metal reclaimed) after cleaning or burning the residual adhesive. If these channels are polymeric then these are cut or shredded and processed with other polymeric waste as discussed below.

Figure 3:
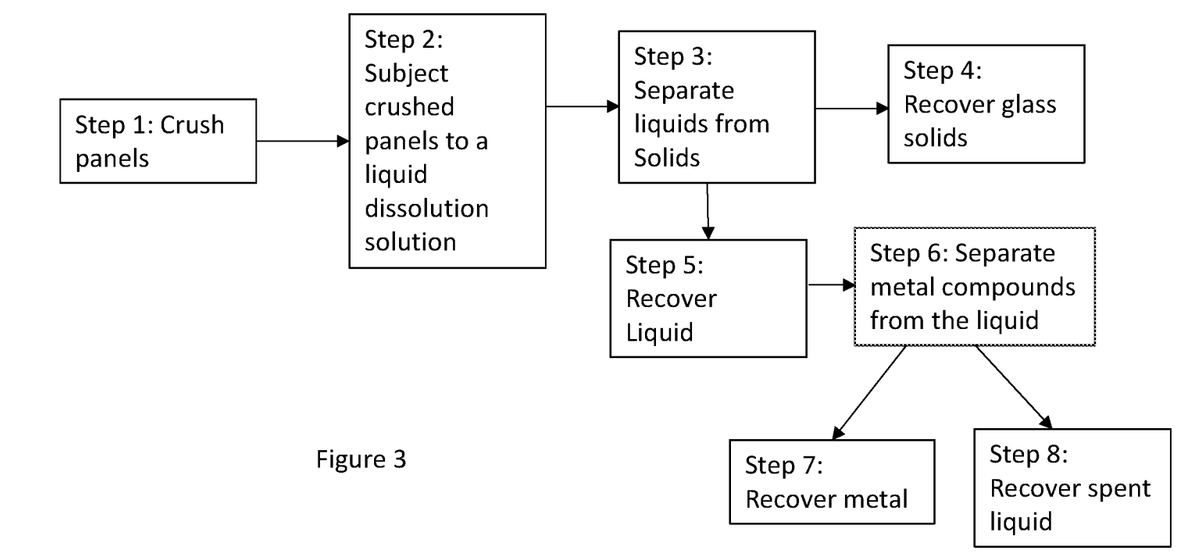
FIG. 3 shows a schematic route for materials recovery and recycling of an EC product at the end of its life.

FIG. 3 shows schematics of a process where the two separated panels of the IGU are recycled and materials reclaimed when there are no organic and polymeric materials in the separated panes. These may be recycled independently or together following this procedure. In Step 1, the panels, principally formed from friable materials such as glass are crushed using impact such as a hammer or a hammer mill to a desired size and passed through a sieve so that the larger pieces can continue to be hammered until the size is reduced to a size lower than the sieve size. This size may be any, however in one embodiment the average size is smaller than 10 square cm, and in another embodiment this may be smaller than 50 square cm and yet in another embodiment this may be smaller than 100 square cm. Fine powder may also be created in this process, thus the average size of glass is determined by weight averaging various pieces and after removing any polymeric or glue pieces that may cause several pieces to stick to each other.

The crushed panels are subjected to a dissolution solution in step 2. The purpose of the dissolution solution is to dissolve metals and metal compounds which may have been deposited as coatings on the panels. In electrochromic devices some of the metal and or metal oxide coatings containing principally indium, tin, tungsten, nickel, lithium, chromium, cobalt, vanadium, molybdenum and phosphorous. The low-e glass coatings will have silver, zinc, aluminum, titanium and silicon containing layers. Of these the higher value metals are indium, silver, lithium, silver, cobalt and tungsten. These dissolution solutions may be highly basic or highly acidic. Highly acidic aqueous solutions such as those comprising sulfuric acid, nitric acid, hydrochloric acid and their mixtures are preferred as these do not attack glass as aggressively and still are able to solvate a wide variety of metals and metal oxides. The acid solutions in this invention are characterized in one embodiment as a pH of 3 or lower, and in another embodiment as a pH of 2 or lower and yet in another embodiment as a pH of 1 or lower. These may also be aided by oxidizing agents (e.g., hydrogen peroxide) or reducing agents, etchants (e.g., ferric chloride) depending on the chemistry and physicochemical properties of the materials to be removed and surfactants suitable for use in acidic or the basic medium (e.g., Niaproof 4 and Niaproof 8 from Niacet Corp (Niagra Falls, N.Y.)). As an example, these solutions may be made in water where the acid may be present by weight in 5 to 30%, oxidizing or reducing agents 0.1 to 30 weight percent, surfactants 0.001 to 2%. This dissolution may be conducted at room temperature or at an elevated temperature (usually in a range of about 40° C. to 100° C.) to enhance solvation rate. The dissolution may be conducted in acid resistant (or base resistant as the case may be) barrels by tumbling, rotating and/or stirring the mixtures.

After the dissolution step, the solids mainly glass is separated (step 3) from the liquids. The recovered glass solids (Step 4) may be rinsed further with water and/or dissolution solvent, which may also be added to the separated liquid. The glass solids may be pulverized and re-used to make glass plates by melting or may be used for a different purpose.

In Step 5, the liquids are recovered which have dissolved metals.

In step 6, the liquids are used to recover the metals (or metal compounds), by using a variety of processes. This can be done by a series of precipitation processes and/or also by electrochemical deposition and ion exchange. The recovered metals in step 7 may be reused or sold (or this liquid may be sold to a processor for metals recovery). The remaining liquid (step 8) after the metals recovery (if acidic) may be neutralized with a base (such as sodium hydroxide) and disposed of as harmless salts or the acids are recovered to be used again.

It should be noted that some or all of the steps from Step 2 to Step 6 may be conducted in several series of steps, where one may treat the materials with a first acid treatment which removes specific metals, which are then recovered from the liquid, the solids are then subject to the next acid treatment (where the composition of acid solution is different) and then the next set of metal(s) is recovered and so on. Or in another variation several metals are dissolved in the solution, but the separation of specific metals is a series of steps such as a step by step process where these may be precipitated or recovered sequentially, e.g., by changing the pH and also adding materials that cause specific metal compounds to be formed at those pHs. This removal of metals as compounds may be reduced to pure materials in Step 8 if desired by electrochemical processes or heating the separated metal compounds under reducing conditions.

In Step 8 one may recover specific ingredients from the liquid for reuse or neutralize the acids (or bases) for safe discharge.

In one embodiment the glass compositions used for all components are similar, including their color. This means that the glass can be recycled and converted to glass sheets for use in the same application or any other application without any change in its optical, mechanical or thermal properties. For glazing applications, it is preferred that soda-lime glass compositions are used for all of the panels. This is an important consideration when the products are being designed to include recyclability as a criterion. When glasses with dissimilar compositions (or inherently different colors) are mixed they may be difficult to recycle to reuse them in a single glass composition due to limited applications of glass with uncontrolled color. For example, the processing profile (e.g., glass transition temperature and flow point) of soda lime glass is very different from that of borosilicate glass. Similarly, when glass compositions of different colors are mixed then it is difficult to control color of these mixtures for remanufactured pristine objects or they may be used for applications where color control from batch to batch is not important. Additionally, it is desirable to mark the glass with a sign separating them in different classes so that during recycling similar classes may be easily identified and mixed. In many cases the EC glass substrate may have certain color to provide a specific appearance (e.g., a color) from the outside of the building. In such cases it is desirable from a recycling perspective that such colors be added as coatings of metals and metal compounds rather than adding them to the glass compositions. When the latter is done, then these coatings are removed by the dissolution solution (steps 2-4) and does not end up as a contaminant in the recovered glass.

Figure 4:
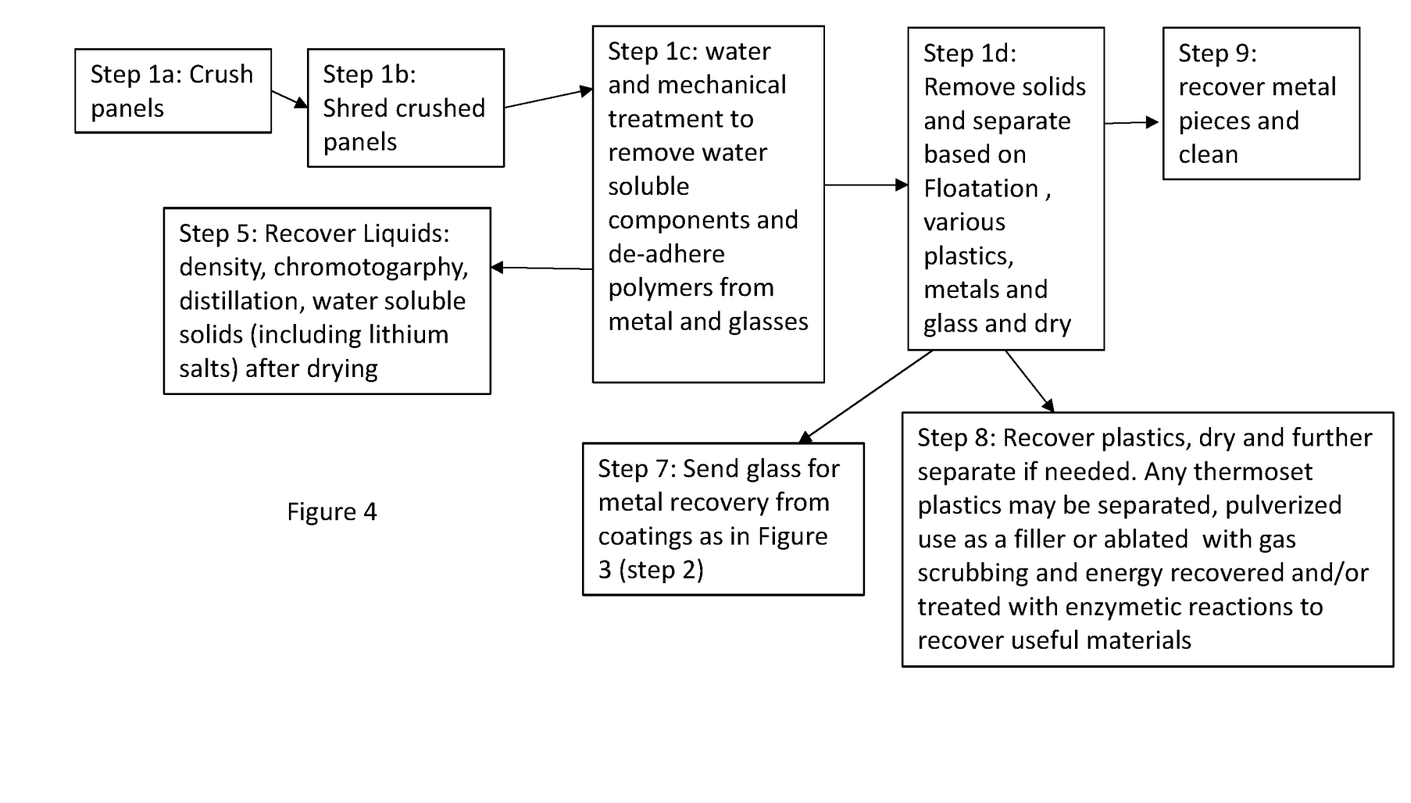
FIG. 4 shows a schematic route for materials recovery and recycling of an EC product at the end of its life.

FIG. 4 shows a recycling process for an EC window which constitutes organic layers also comprising polymeric materials. These layers may be part of an EC device (discussed later in FIG. 6) and/or may be external to the EC devices. When polymeric materials are used to laminate an already formed EC device to another sheet of glass or a polymeric sheet, then this arrangement is considered external to the EC device. For building windows it is more common to laminate EC panels to another glass sheet, whereas in automotive application the probability of using a plastic sheet to bond to a glass component is higher. For those windows which use EC panels like the ones described earlier when discussing FIG. 3, i.e., no organic layers are used within the EC structure, and the organic component is mainly from the lamination materials, the recycling method may be used as described in FIG. 4.

FIG. 4 shows a recycling method where the windows are crushed as depicted in step 1a (similar to step 1 of the process shown in FIG. 3). However due to the lamination aspect large pieces of polymeric material may remain attached to small broken pieces of glass. Thus, the crushed product is separated by size (as in Step 1 of FIG. 3) and collected, and the larger pieces of polymer to which smaller pieces of glass are still adhered to is taken to Step 1b and the pieces are shred (primarily the polymer is shred) and taken to Step 1c. Although because of mechanical processing Steps 1a and 1b, the adhesion between the glass and the polymer is substantially weakened. In this step polymer pieces adhered to glass are subject to large tumbling forces in presence of water. This further weakens the adhesion and the glass and polymer separate, in addition any water-soluble components (e.g., plasticizers in the polymer, salts or other components) are removed from these pieces. Water may be heated in this process generally in the range of about 40 to 100° C., to assist with increasing the process yield i.e., more complete recovery and/or shortening of the processing time. The solids are recovered and further processed in Step 1d. The liquids are removed as in Step 5 and processed further. It is also possible that liquid plasticizers in the electrolyte which are insoluble in water are also removed, e.g., hydrophobic ionic liquids if present. These can be largely separated by decanting due to density differences between the water and this medium. These may also be separated by using hydrophobic or hydrophilic filtration mediums which only allow one of these types of materials to pass through. Water soluble materials may also be recovered by drying the water or adding other additives to precipitate the desired materials. The use of water as a solvent in the specification is different from aqueous acid solutions used for metal dissolution discussed above, as the pH of water used usually ranges from about 4.5 to 9.5.

In FIG. 4 (Step 1d), the solid chunks are separated based on their composition (such as pieces of polymers, metals and glass). This may be done by various methods, such as separation by density and surface chemistry (e.g. by floatation). One may even distinguish further, where polymers may be separated into different polymers, metals into different metals and so on. The metals pieces may come into play primarily from the electrochromic devices where metal tapes and connectors may have been used as busbars and current carrying elements and pieces of metals are mingled into this stream. The metal pieces (recovered in step 1d) may be cleaned by processing at temperatures in excess of 250° C. to incinerate any polymeric (adhesive) residues, and in another embodiment this temperature is 400 C or higher. The glass collected in this step is combined with the glass pieces collected from step 1a and then as in Step 7 it is send for further processing to recover metals from the coatings using dissolution (as was discussed in steps 2 to 8 of FIG. 3, where the metal containing coatings on glass are removed in an acidic solution and the pure glass solids and metals from these coatings are recovered).

The busbars on the EC glass may also be formed by depositing conductive lines around the perimeter using glass (or ceramic) frits containing silver. These compositions typically comprise of ceramics not found in usual glass compositions, and from a recycling perspective it is difficult to remove them from the glass compositions of the substrate. Thus, from a recycling perspective, the use of metallic tapes is preferred. The tapes with z-axis conductive adhesives (such as those available from 3M (St. Paul, Minn.) may be used for the busbar as these are easy to separate and recycle. Some examples of such tape products from 3M have product ID numbers as 3007 and 3011.

Step 8 of FIG. 4 shows that the polymers are recovered, which may be further separated based on floatation or other methods (including differential melting points of the various polymers), dried and recycled for various applications. Floatation properties of polymers are also influenced by the additives present in them, such as fillers and the wetting agents. Thus as long as the wetting agents do not adversely interact with the desired properties that a particular polymer imparts, for improving recyclability different wetting agents to different polymeric layers are added so that when these materials are recycled it is easier to separate various polymers. Typically, when separating polymers by floatation a preferred average particle size surface area range is from about 10 square mm to about 200 square cm, thus in one embodiment it is preferred that the polymeric waste be reduced to this size. For, example, the polymers may still contain additives such as water insoluble plasticizers, UV absorbers, antioxidants, fillers, flame retardants, antiblocking agents and processing aids, colorants, polymer modifiers, wetting agents, etc. Such materials may be used for a variety of applications and may be combined with other materials such as recycled foams to form binders, carpet backings or mixed with asphalt or used instead of asphalt for road construction, etc. Some of the common materials used for laminating glass sheets are poly vinyl butyral (PVB), thermoplastic polyurethane (TPU), ethyl vinyl acetate (VA), fluorinated polymers, etc. Again markings on windows identifying the type of lamination resin would be helpful from a recyclability perspective so that the waste streams are easy to identify. In some cases, plastic films or EC elements made using flexible plastics as substrates are laminated or bonded to glass substrates using another polymeric laminating sheet or an adhesive. Such constructions may be used in the automotive industry or for retrofitting these polymeric EC elements on glass windows for buildings. In these cases, there is an additional polymeric substrate material which in recycling has to be separated from the laminated glass material. Typical plastic sheet or film materials used for as substrates for making EC or LC devices are clear stable polymers such as polyesters (typically polyethylene terephthalate (PET), polyethylene naphthalate (PEN)), polycarbonate, acrylics, fluorinated and chlorinated polymers and copolymers such as those containing polyvinylidene fluoride (PVDF), polyvinylidene chloride (PVDC) and polyethylene-chloro-trifluoro-ethylene (ECTFE). Generally, acrylics and polycarbonates are used in thicker sheet stock (high thickness with rigidity, i.e., equal to or greater than about 1 mm in thickness to about 10 mm), and the other materials are used as films (usually 0.5 mm or less in thickness to down to about 0.025 mm). Again, markings on such window systems to alert the recycler of the material composition are helpful to disassemble and tailor the recycling process.

It is possible windows with different glass compositions may end up in one waste stream, and they can be in applications which have lower product value as discussed earlier. Further, if a product is being designed for recyclability, and an enzymatic and/or incineration process is involved in getting rid of organic materials (and/or generating useful materials), it is preferred that materials which cause heavy load of sulfur, fluorine and chlorine are not used or used in smaller amounts so that the load on scrubber containing acidic or fumes containing these materials is reduced. This would mean using less of the fluorinated and the chlorinated materials such as fluorinated and chlorinated polymers and copolymers. In another embodiment these materials are not used to improve recyclability.

Another solvent recovery step may be either substituted for step 1c in FIG. 4 or inserted between the steps 1b and 1c (this step is not shown in this figure). If there are specific ingredients that need to be recovered prior to the water treatment, organic solvent treatments may be used to accomplish this. In one embodiment, the organic solvents are so selected are so that they target reclaiming specific materials without solvating all of the ingredients, e.g., this may be a non-solvent for some of the polymeric species so that the increase in viscosity of the solution during the recovery is low and high recovery efficacy of the target ingredients is maintained. Introduction of this step or a series of steps with different solvents to recover specific materials is advantageous. This ensures that high purity of extracted materials is maintained in each stream which reduces the burden of separating them later. As an example, by introducing this step one may obtain only the lithium salts and/or specific plasticizers if they are of high value, such as ionic liquids and liquid crystal materials if used.

Some examples of ionic liquids are salts of quarternary ammonium cations of pyridinium, pyrrolidinium, pyridazinium, pyrimidinium, pyrazinium, imidazolium, pyrazolium, thiazolium, oxazolium, and triazolium. These may have various substitutions or substituents, such as H, F, phenyl and alkyl groups with 1 to 15 carbon atoms. Rings may even be bridged. Saturated rings such as pyrrolidinium are preferred for superior UV stability for clear systems and they also tend to have superior electrochemical stability range. The anions of these salts are typically fluorine containing such as triflate ($CF_3SO_3^-$), imide ($N(CF_3SO_2)_2^-$), beti ($(C_2F_5SO_2)_2N^-$), methide ($(CF_3SO_2)_3C^-$), tetraflouroborate ($BF_4^-$), hexaflourophosphate ($PF_6^-$), hexafluoroantimonate ($SbF_6^-$), bis(fluorosulfonyl)imide ($N(FSO_2)_2^-$) and hexafluoroarsenate ($AsF_6^-$). Of these, imide, beti bis(fluorosulfonyl)imide and methide anions are able to provide hydrobhobicity. An example of a hydrophobic ionic liquid is 1-butyl-3-methyl pyrrolidinium bis(trifluoromethanesulfonyl)imide (BMP). When in an electrolyte ionic liquids and lithium salts are used, in some embodiments the anion for both are similar.

Figure 5:
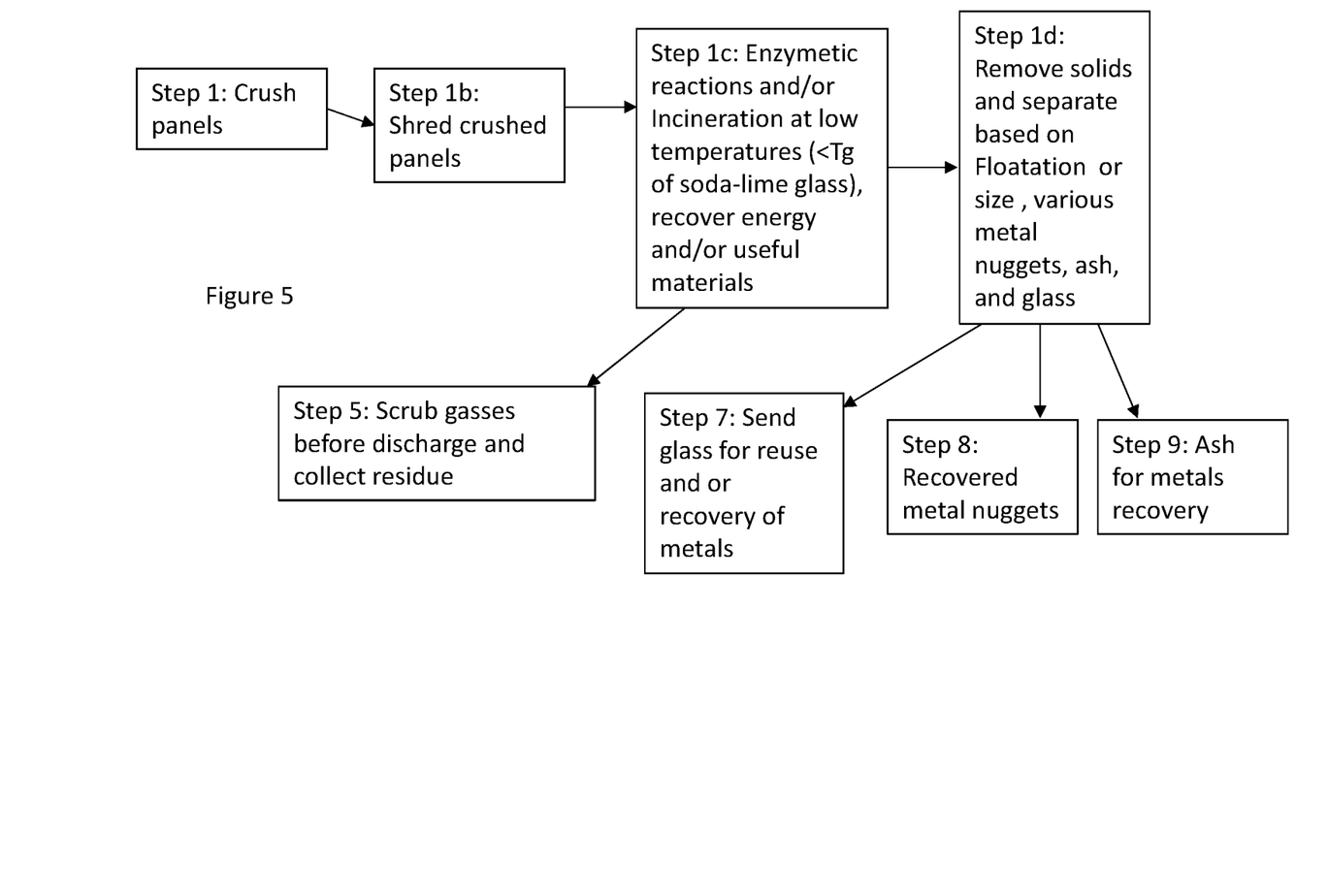
FIG. 5 shows a schematic route for materials recovery and recycling of an EC product at the end of its life.

Another EC window recycling scheme is shown in FIG. 5. In this scheme, the organics are burnt off to produce energy and only the metals and the glass are recovered. This scheme is particularly useful when too many different organics and polymers are used where it is not economically feasible to recover and separate them. In Step 1 the windows are crushed. If the windows or the EC element have a laminated layer which causes large pieces to form with broken glass adhered to that then it is shred as in Step 1b, or Step 1b may be skipped and go to step 1c. In Step 1c all the materials are heated to temperatures less than the glass transition temperature of soda—lime glass, i.e., the most used glass (in another embodiment to temperatures at or less than about 400° C.) to burn of all of the organic materials and the energy is recovered and the gases are scrubbed. The minimum temperature of burn organic materials in another embodiment is 300° C. Some of the gases such as carbon dioxide may be reused to make fuels or polymers. In step 1d, remnants of metals, chunks of glass and ash is produced. In one embodiment, the incineration is done in the presence of oxygen so as to obtain the residue of metals as metal oxides. In another embodiment when incineration is carried out under reducing conditions then metal or metal oxides are formed interlaced with carbon containing soot. Another way to treat the organic materials is by treating them with enzymes so as to break these into more useful materials rather than introducing carbon dioxide into the atmosphere. Some useful materials are hydrogen, carboxylic acids, etc. The left over organics after enzymatic digestion may be incinerated.

In FIG. 5, Step 1c, since the heating is carried out at temperatures less than the glass transition (Tg) temperature of glass, the glass pieces do not fuse and are easy to separate. Metals are from connectors and conducting tapes. The metallic chunks and glass chunks are separated from the fine powder, where the fine powder (mainly metal oxides) may be used to recover high value and toxic metals as discussed earlier by dissolving them in an acidic solution. The glass and the metals may be pulverized further under impact where the glass chunks will break further in small pieces and the metals being malleable may end up as larger flakes. These can be then separated based on size or flotation. Some type of metals may also be removed or recovered using magnets. Glass and metal may be recycled. If glass has residue of metallic coatings this may be first treated with an acidic solution to remove these before recycling (or reusing). The ash is treated with acids to recover high value or toxic metals and any residue is discarded. To recover metals from the glass (step 7) and ash (step 9), these two streams are combined (after metallic chunks have been removed) and subject them to a common acid treatment.

Figure 6:
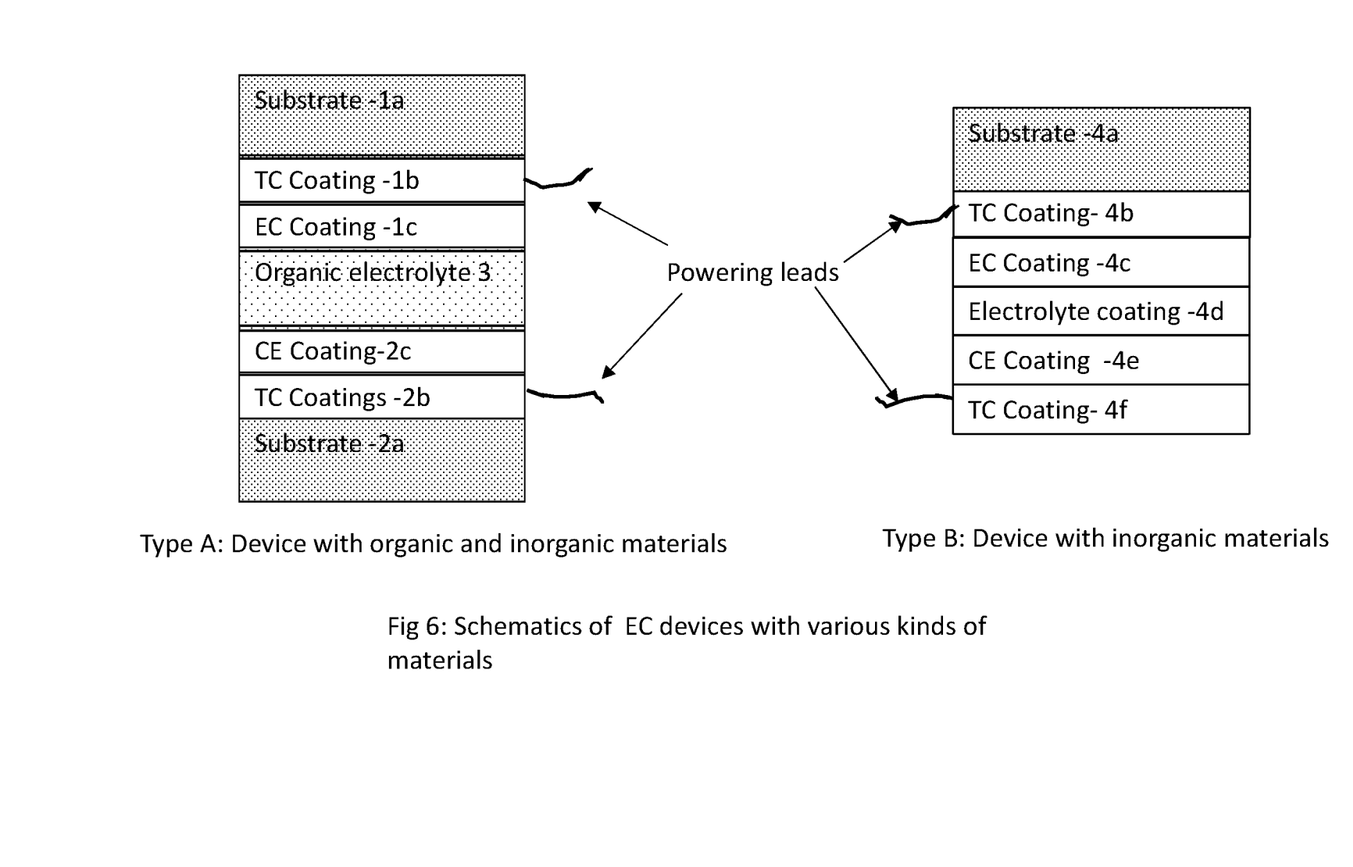
FIG. 6 illustrates exemplary electrochromic (EC) device structures.

FIG. 6 show two types of EC device constructions most often used for windows. Additional layers may be used to promote interfacial compatibility, reduce iridescence, enhance memory, electrical conductivity, color, etc. In the Type A device an Organic Electrolyte 3 is used. The device is made by taking a pair of substrates, where the first substrate 1a is coated with a transparent conductive (TC) layer 1b such as indium tin oxide or other materials or be a combination of various layers. Similarly a substrate 2a is also coated with a TC layer 2b. The layer 2a is coated with an electrochromic (EC) layer such as containing tungsten oxide, molybdenum oxide, vanadium oxide, nickel oxide and lithium oxide. Layer 2b is coated with a counter electrode (CE) layer 2c. Layer 2c may also be electrochromic and usually it is complimentary to the EC layer, which means if the EC layer colors upon reduction then the CE layer colors upon oxidation, so that both layers either color when the coloring power is applied and also both bleach when power to bleach is applied. A liquid crystal device is similar to that shown in FIG. 6, but does not have an EC and CE coatings and the electrolyte layer is substituted with a polymeric layer containing a liquid crystalline material.

The counterelectrode 2c may comprise of a metal compound (usually a metal oxide) selected from nickel oxide, cerium oxide, titanium oxide, vanadium oxide, cobalt oxide and lithium oxide or their combinations amongst themselves or with other materials. The EC and/or the CE layers may also contain additional lithium which reduces the oxidation state o metal in the metal compound. In a variation of this device both or one of the EC layer and the CE layer may also be formed by using a coating of an organic material or mixtures of organic and inorganic materials. Organic electrolyte 3 in the above device comprises typically of polymers, plasticizers, UV stabilizers and lithium salts. Some of the plasticizers may be ionic liquids which are high value items and their recovery is economically and environmentally beneficial, and the lithium amount in this layer is present in a much higher amount as compared to any of the other layers which may also be recovered. Some of the polymers used in electrolytes comprise polyurethanes, acrylics (includes PVB) and fluoropolymers. For recyclability as discussed earlier in one embodiment fluoropolymers are less preferred as in incineration higher amounts of halogens are given off. Some of the non-ionic plasticizers include propylene carbonate, diethylene carbonate, gamma-butyro lactone, tetraglyme, sulfolane, ionic liquids, esters and their mixtures. Since sulfolane causes a sulfur load for recycling, in one embodiment, sulfolane is not used or is a less preferred option. A few of the common lithium salts are lithium perchlorate, lithium tetrafluoroborate, lithium hexaflurophosphate and lithium bis-trifluoromethanesulfonimide. All of these lithium salts are water soluble. All of the lithium salts contain halogens, but since their use in an EC device is small relative to the other components these are not expected to cause a large overload of gases in case incineration process is used to get rid of the organic components.

In EC windows and commercial EC devices, the weight of the electrolyte is typically less than 5%, and more often less than 1%. In one embodiment, for devices with high potential to recycle, the amount of lithium salt in these devices is less than 20% by weight and more than 1% by weight, based only on the electrolyte weight. In another embodiment for recyclable devices the weight of the lithium salt is less than 10% by weight of the electrolyte, and yet in another embodiment it would be less than 5% of the weight of the electrolyte.

There are other types of devices which use two substrate constructions and are commonly used for automotive mirrors and aircraft windows. In these there is no CE or EC layer, but the electrolyte contains redox dyes in addition to the components mentioned above. Yet in another variation the EC layer is there but the CE is replaced by a redox dye in the electrolyte. For mirrors one of the TC is generally replaced by a multilayer structure comprising a metallic reflector overcoated with a transparent conductor. Some of the materials used for the reflective layer comprise silver, aluminum, rhodium, ruthenium, their alloys and the transparent conductors are usually indium tin oxide and aluminum zinc oxide. Chromium and titanium layers may be used to promote adhesion of the metallic layers to the substrate.

Type B device (FIG. 6) principally comprises of a multilayer system deposited on a single substrate 4a. The layers deposited on this substrate are usually all inorganic. Such a device is built by taking a substrate and depositing a TC layer (4b) with a composition described in Type A device followed by an inorganic ion-conductor layer and then followed sequentially by an EC layer (4c) CE layer (4e) and another TC layer (4f). Sometimes these devices are laminated with another piece of glass to provide mechanical and chemical protection to the underlying layers. The laminating polymers are typically the same which are used for glass lamination and discussed above. The electrolyte layer (4d) comprises of oxides and nitrides of several materials such as lithium, phosphorous, aluminum, silicon and others. The electrolyte layer may comprise of more than one layer with different compositions to improve the compatibility with the EC and the CE layers.

The busbars in the devices may be metallic clips, conductive frits and metal tapes with conductive adhesives which span at least one side of the substrate (sometimes two or all sides) for each of the TC layer in a device. Conductive frits usually have metal oxides and silver metal, the spring clips are made of steel nickel and copper alloys, and the tapes are usually copper which may be tin plated to prevent corrosion and be able to easily attach the soldered connectors to them. The tapes have conductive adhesive on one side which usually comprises of an organic pressure sensitive adhesive with conductive particles dispersed in it. In addition to these components in the Type A devices there is a perimeter adhesive (not shown) to protect the interior of the device, particularly the EC layer, CE layer and the electrolyte. These organic materials are usually thermosetting polymers.

The materials of construction of smart windows are briefly described above to help understand the complexity of the materials variety present in the smart windows, which have to be considered for an effective recycling process.

The foregoing description of the invention has been presented for purposes of illustration and description and is not intended to be exhaustive or to limit the invention to the precise form disclosed, and obviously, many modifications and variations are possible considering the above teaching. The embodiments were chosen and described to best explain the principles of the invention and its practical application to thereby enable others skilled in the art to best utilize the invention in various embodiments and with various modifications as are suited to the use contemplated. It is intended that the scope of the invention be defined by the claims appended hereto.

The invention claimed is:

1. A method of recycling an electrochromic window, wherein the electrochromic window comprises coated glass and organic components, wherein the coated glass comprises one or more coatings comprising a metal or metal oxide, wherein the metal forming the metal or metal oxide is at least one of lithium, indium, rhodium, ruthenium, tungsten, nickel, and tin, the method comprising: breaking the electrochromic glass window into broken glass pieces having an average size of less than 100 cm$^2$; and heating the broken glass pieces to a temperature lower than the glass transition temperature of the said glass to incinerate the organic components remaining on the glass and removing the metal or metal oxide from the one or more coatings without melting the glass.

2. The method of claim 1, wherein the method comprises treating the broken glass pieces after incineration in an acidic solution having a pH of less than 3 to dissolve at least a portion of the one or more coatings.

3. The method of claim 1, wherein the heating step comprises performing the incineration in oxygen or under reducing conditions.

4. The method of claim 1, wherein after the incineration, a mixture of broken glass pieces, metal, and ash are obtained, the method further comprising separating the broken glass pieces, metal, and ash after the incineration step.

5. The method of claim 4, wherein after the incineration, the method further comprises treating at least one of the broken glass pieces and ash in an acidic solution having a pH of less than 3 to dissolve a portion of the one or more coatings.

6. The method of claim 5, wherein the method further comprises recovering at least one metal from the acid solution.

7. The method of claim 5, wherein the method further comprises recycling the broken pieces of glass into glass objects after the acidic solution treating step.

8. The method of claim 2, wherein the method further comprises recovering at least one metal from the acid solution.

9. The method of claim 1, wherein the electrochromic window further comprises metal components, the method further comprising separating at least a portion of the metal components or the metal from the metal components from the glass pieces after the incineration step.

10. A method of recycling an electrochromic glass mirror, wherein the electrochromic minor comprises coated glass and organic components, wherein the coated glass is coated with one or more coatings comprising one or more metals and metal oxides, and the metal in the one or more metals or metal oxides is at least one of lithium, indium, rhodium, ruthenium, tungsten, nickel, and tin, the method comprising:

breaking the electrochromic glass mirror into broken glass pieces having an average size of less than 100 cm$^2$;
heating the broken glass pieces to a temperature below a glass transition temperature of the broken glass pieces; and
incinerating the organic components sticking to the broken glass pieces and removing a portion of the one or more metals and metal oxides from the one or more coatings without melting the broken glass pieces.

11. The method of claim 10, wherein the method comprises treating the broken glass pieces after the incinerating step in an acidic solution having a pH of less than 3 to dissolve the coatings.

12. The method of claim 11, further comprising recovering at least one of the metals from the acidic solution.

13. The method of claim 11, further comprising recycling the broken glass pieces into glass objects after the acidic solution treating step.

14. The method of claim 10, wherein the electrochromic window further comprises one or more metal components, the method further comprising separating at least a portion of the one or more metal components or the metal from the one or more metal components after the incineration step.

15. A method of recycling an electrochromic window or minor comprising coated glass and organic components, wherein the coated glass is coated with one or more coatings comprising one or more metals and metal oxides, and the metal in the metals or metal oxides is at least one of lithium, indium, rhodium, ruthenium, tungsten, nickel, and tin, the method comprising:

a recycling process comprising separating a portion of the organic components from the coated glass;
heat treating the coated glass at a temperature below the glass transition temperature of the coated glass; and
incinerating organic components sticking to the coated glass and removing a portion of the one or more metals and metal oxides from the one or more coatings without melting the glass.

16. The method of claim 15, wherein the electrochromic window further comprises one or more metal components, the method further comprising separating at least a portion of the one or more metal components or the metal in the one or more metal components after the incineration step.

17. The method of claim 15, wherein the method further comprises treating the said glass after the incineration step in an acidic solution having a pH of less than 3 and dissolving at least a portion the one or more coatings.

18. The method of claim 17, further comprising recovering at least one of the metals from the acid solution.

19. The method of claim 17, further comprising recycling the glass into glass objects after the acidic solution treating step.

* * * * *